US012236636B2

(12) United States Patent
Wang et al.

(10) Patent No.: US 12,236,636 B2
(45) Date of Patent: Feb. 25, 2025

(54) DISTANCE MEASUREMENT METHOD, DISTANCE MEASUREMENT APPARATUS, AND COMPUTER-PROGRAM PRODUCT

(71) Applicant: BOE Technology Group Co., Ltd., Beijing (CN)

(72) Inventors: Jingru Wang, Beijing (CN); Xiaojun Tang, Beijing (CN); Guangli Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 434 days.

(21) Appl. No.: 17/761,183

(22) PCT Filed: May 31, 2021

(86) PCT No.: PCT/CN2021/097204
§ 371 (c)(1),
(2) Date: Mar. 16, 2022

(87) PCT Pub. No.: WO2022/252007
PCT Pub. Date: Dec. 8, 2022

(65) Prior Publication Data
US 2022/0383544 A1 Dec. 1, 2022

(51) Int. Cl.
G06T 7/73 (2017.01)
G06T 7/564 (2017.01)
G06T 7/62 (2017.01)

(52) U.S. Cl.
CPC ............... G06T 7/74 (2017.01); G06T 7/564 (2017.01); G06T 7/62 (2017.01);
(Continued)

(58) Field of Classification Search
CPC .. G06T 7/74; G06T 7/564; G06T 7/62; G06T 2207/10024; G06T 2207/20224;
(Continued)

(56) References Cited

U.S. PATENT DOCUMENTS

2004/0130546 A1* 7/2004 Porikli ............... G06T 7/11
345/423
2008/0204579 A1* 8/2008 Masuda ............... G06T 5/73
348/254
(Continued)

FOREIGN PATENT DOCUMENTS

CN 109631912 A 4/2019
JP 2007094536 A 4/2007
(Continued)

OTHER PUBLICATIONS

International Search Report & Written Opinion mailed Mar. 2, 2022, regarding PCT/CN2021/097204.

Primary Examiner — Chan S Park
Assistant Examiner — Daniel C Chang
(74) Attorney, Agent, or Firm — Intellectual Valley Law, P.C.

(57) ABSTRACT

A distance measurement method is provided. The distance measurement method includes obtaining an image of a target device, the image of the target device including a target object of a first color and a background object of a second color, the first color being different from the second color; processing the image of the target device to obtain a processed image, the processed image including a processed target object of a third color and a processed background object of a fourth color; detecting a contour of the processed target object of the third color; calculating an area encircled by the contour; and calculating a distance between a camera and the target device upon determination of the area encircled by the contour.

18 Claims, 8 Drawing Sheets

(52) U.S. Cl.
CPC .............. *G06T 2207/10024* (2013.01); *G06T 2207/20224* (2013.01); *G06T 2207/30201* (2013.01)

(58) Field of Classification Search
CPC . G06T 2207/30201; G06T 2207/20156; G06T 7/11; G06T 7/187; G06T 7/13; G06T 2207/20061
See application file for complete search history.

(56) References Cited

U.S. PATENT DOCUMENTS

| | | | |
|---|---|---|---|
| 2013/0021627 A1 | 1/2013 | Murata | |
| 2020/0265601 A1* | 8/2020 | Uchida | .................. G01B 11/02 |
| 2021/0377547 A1* | 12/2021 | Tourapis | .............. H04N 19/189 |

FOREIGN PATENT DOCUMENTS

| | | | | |
|---|---|---|---|---|
| JP | 2010016661 A | | 1/2010 | |
| JP | 2018059890 A | | 4/2018 | |
| KR | 20140065210 A | * | 5/2014 | .............. G01C 3/06 |
| RU | 2655467 C1 | | 5/2018 | |

* cited by examiner

DISTANCE MEASUREMENT METHOD, DISTANCE MEASUREMENT APPARATUS, AND COMPUTER-PROGRAM PRODUCT

CROSS-REFERENCE TO RELATED APPLICATION

This application is a national stage application under 35 U.S.C. § 371 of International Application No. PCT/CN2021/097204, filed May 31, 2021, the contents of which are incorporated by reference in the entirety.

TECHNICAL FIELD

The present invention relates to a distance measurement method, a distance measurement apparatus, and a computer-program product.

BACKGROUND

Distance measurement typically requires a binocular camera. Alternatively, distance measurement may be performed using two monocular cameras. These requirements make it costly to manufacture the distance measurement apparatus.

SUMMARY

In one aspect, the present disclosure provides a distance measurement method, comprising obtaining an image of a target device, the image of the target device comprising a target object of a first color and a background object of a second color, the first color being different from the second color; processing the image of the target device to obtain a processed image, the processed image comprising a processed target object of a third color and a processed background object of a fourth color; detecting a contour of the processed target object of the third color; calculating an area encircled by the contour; and calculating a distance between a camera and the target device upon determination of the area encircled by the contour.

Optionally, processing the image of the target device comprises performing a grayscale processing on the image of the target device.

Optionally, processing the image of the target device comprises obtaining color component values in a color space of a pixel data of the image of the target device; and converting the color component values into converted color component values based on a first conversion algorithm.

Optionally, the color component values of the pixel data comprise a first color component value and a second color component value; wherein the first conversion algorithm comprises subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

Optionally, the color component values of the pixel data comprise a first color component value, a second color component value, and a third color component value; wherein the first conversion algorithm comprises assigning the first color component value of the pixel data as a color component value for each color component of the pixel data, thereby obtaining the converted color component values of the processed image.

Optionally, prior to detecting the contour of the processed target object of the third color, the distance measurement method further comprises applying a shape detection algorithm to detect at least one object in the processed image having a target shape; and determining an object from the at least one object as the processed target object.

Optionally, a plurality of objects having the target shape are detected upon applying the shape detection algorithm; wherein the distance measurement method further comprises calculating aspect ratios respectively of the plurality of objects having the target shape with respect to a reference object in the processed image; and wherein determining an object from the at least one object as the processed target object comprises selecting an object having an aspect ratio with respect to the reference object in a target range as the processed target object.

Optionally, the reference object is a facial image object of a subject.

Optionally, calculating the area encircled by the contour comprises selecting one or more pixels as seeds for region growing; growing a respective seeded region comprising a respective seed in an iterative fashion, wherein, at each iteration, pixels adjacent to the respective seeded region are evaluated by a threshold criteria, and one or more pixel that satisfy the threshold criteria are appended into the respective seeded region; and generating a segmented image when all pixels in the processed image are assigned into their respective seeded regions.

Optionally, the distance measurement method further comprises applying a shape detection algorithm to detect at least one object in the processed image having a target shape; wherein selecting one or more pixels as seeds for region growing comprises selecting a geometrical center of the target shape as a seed; and an area of a seeded region comprising the geometrical center of the target shape as the seed in the segmented image is determined as the area encircled by the contour.

Optionally, calculating the distance between the camera and the target device upon determination of the area encircled by the contour comprises calculating the distance between the camera and the target device based on a second conversion algorithm.

Optionally, the second conversion algorithm is $$D = \frac{k}{\sqrt{A + d1 + d2}};$$

wherein D stands for the distance between the camera and the target device, A stands for the area encircled by the contour, k, d1, and d2 are predetermined fitted parameters, wherein the distance measurement method further comprises calibrating the second conversion algorithm to determine k, d1, and d2 using a reference distance between the camera and the target device and a reference area encircled by the contour corresponding to the reference distance.

Optionally, the distance measurement method further comprises caching the distance between the camera and the target device as a presently cached distance; and averaging the presently cached distance and one or more historically cached distances to obtain an averaged distance.

Optionally, the distance measurement method further comprises obtaining a second image of the target device; and determining whether the second image of the target device comprises the target object.

Optionally, upon a determination that the second image of the target device comprises the target object, the distance measurement method further comprises processing the second image of the target device to obtain a second processed image, the second processed image comprising a second processed target object of the third color and a processed background object of the fourth color; detecting a second contour of the second processed target object of the third color, determining an area encircled by the second contour; and calculating a second distance between the camera and the target device upon determination of the area encircled by the second contour.

Optionally, upon a determination that the target object is absent in the second image of the target device, the distance measurement method further comprises assigning a historically cached distance as a presently cached distance between the camera and the target device with respect to the second image; or the distance measurement method further comprises obtaining images of the target device and determining whether the images of the target device comprises the target object in an iterative manner; and upon a determination that the target object is absent in N consecutive images of the target device, clearing historically cached distances, and providing indication that the target device is positioned incorrectly, N≥2, N being an integer.

Optionally, the distance measurement method further comprises obtaining an original image captured by the camera; determining presence or absence of a reference object in the original image; and upon a determination that the reference object is present in the original image, cropping the original image around the reference object by a margin of M times of a size of the reference object, thereby obtaining the image of the target device. M≥2; wherein the image of the target device comprises the target object, the background object, and the reference object.

In another aspect, the present disclosure provides a distance measurement apparatus, comprising a memory; one or more processors; wherein the memory and the one or more processors are connected with each other; and the memory stores computer-executable instructions for controlling the one or more processors to obtain an image of a target device, the image of the target device comprising a target object of a first color and a background object of a second color; process the image of the target device to obtain a processed image, the processed image comprising a processed target object of a third color and a processed background object of a fourth color; detect a contour of the processed target object of the third color; calculate an area encircled by the contour; and calculate a distance between a camera and the target device upon determination of the area encircled by the contour.

Optionally, the distance measurement apparatus further comprises the target device having a target portion of the first color and a background portion of the second color.

In another aspect, the present disclosure provides a computer-program product comprising a non-transitory tangible computer-readable medium having computer-readable instructions thereon, the computer-readable instructions being executable by a processor to cause the processor to perform obtaining an image of a target device, the image of the target device comprising a target object of a first color and a background object of a second color; processing the image of the target device to obtain a processed image, the processed image comprising a processed target object of a third color and a processed background object of a fourth color, detecting a contour of the processed target object of the third color; calculating an area encircled by the contour, and calculating a distance between a camera and the target device upon determination of the area encircled by the contour.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a distance measurement method, a distance measurement apparatus, and a computer-program product that substantially obviate one or more of the problems due to limitations and disadvantages of the related art. In one aspect, the present disclosure provides a distance measurement method. In some embodiments, the method includes obtaining an image of a target device, the image of the target device comprising a target object of a first color and a background object of a second color, the first color being different from the second color; processing the image of the target device to obtain a processed image, the processed image comprising a processed target object of a third color and a processed background object of a fourth color; detecting a contour of the processed target object of the third color; calculating an area encircled by the contour; and calculating a distance between a camera and the target device upon determination of the area encircled by the contour.

Figure 1:
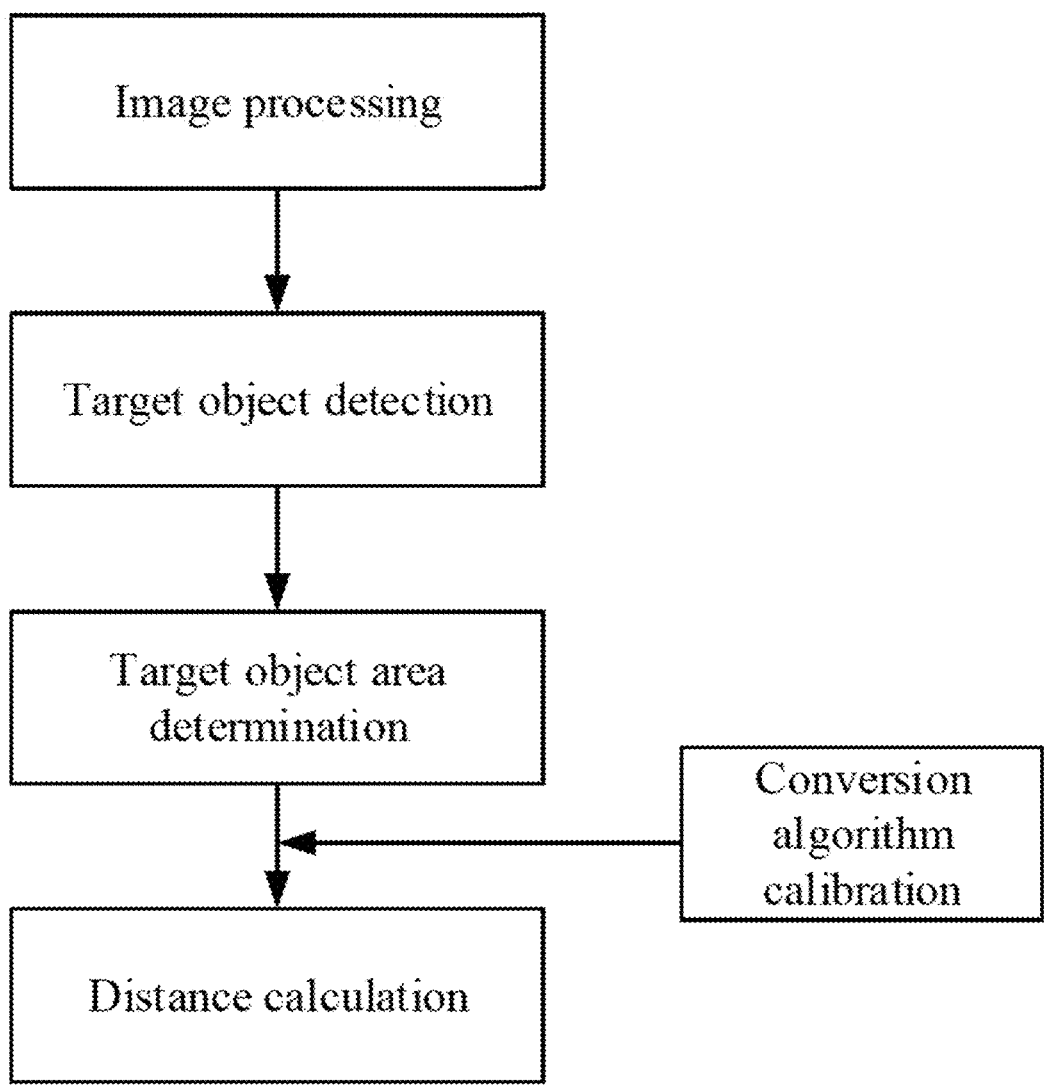
FIG. 1 is a flowchart of a distance measurement method in some embodiments according to the present disclosure.

FIG. 1 is a flowchart of a distance measurement method in some embodiments according to the present disclosure.

Referring to FIG. 1, in some embodiments the distance measurement method includes several steps, including image processing, target object detection, target object area determination, and distance calculation. In one example, the distance calculation is performed based on a second conversion algorithm. In some embodiments, the method further includes a step of second conversion algorithm calibration, in which one or more parameters of the second conversion algorithm are calibrated.

In some embodiments, the method may be conveniently implemented by utilizing a target object for facilitating the distance measurement. In one example, a subject may be holding the target object facing a camera. The camera captures one or more frames of images of the target object, for example, one or more images of the subject holding the target object. The method according to the present disclosure can accurately determine the distance between the target device (the subject) and the camera. One of the several advantages of the present method resides in that a monocular camera is sufficient for the distance measurement, e.g., the present method does not rely on a binocular camera for measuring distance.

Figure 2:
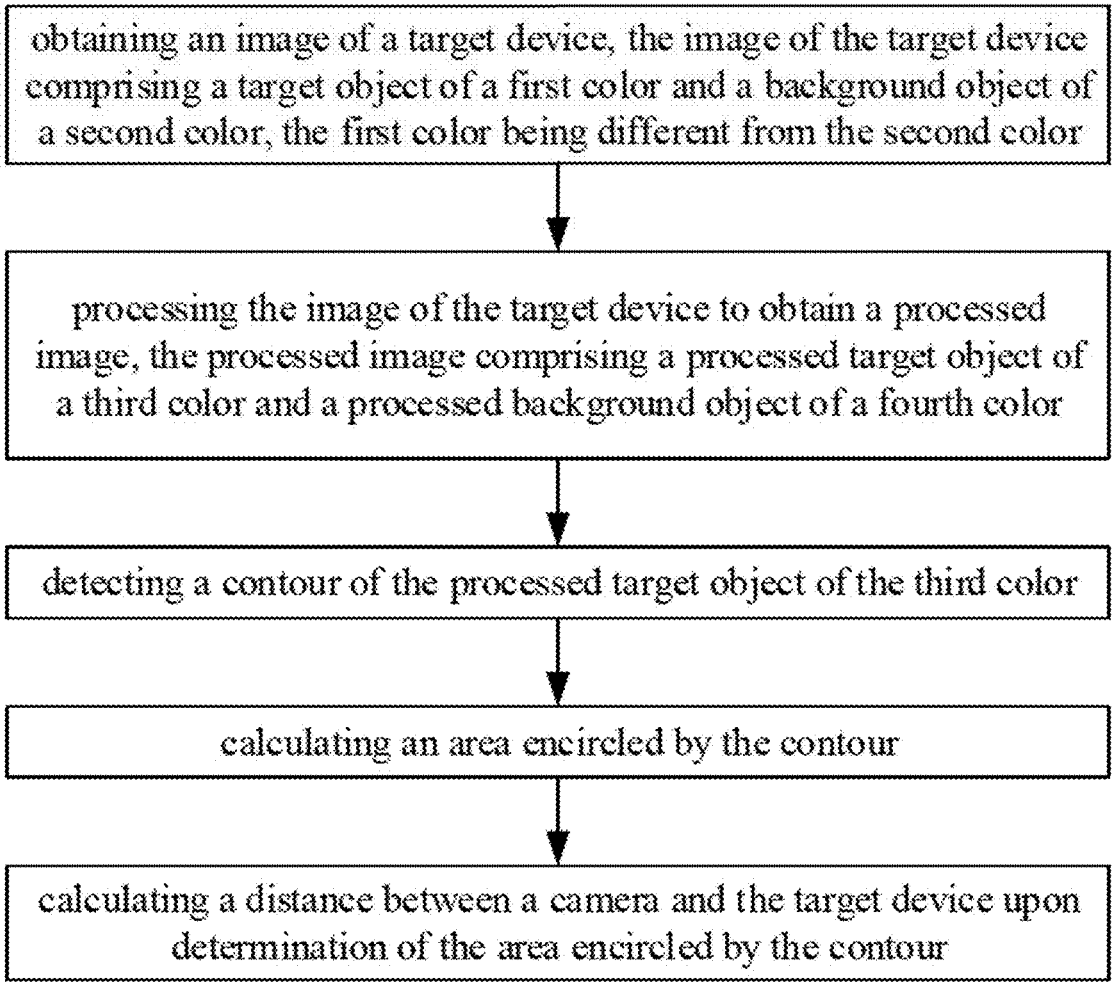
FIG. 2 is a flowchart of a distance measurement method in some embodiments according to the present disclosure.

FIG. 2 is a flowchart of a distance measurement method in some embodiments according to the present disclosure. FIG. 2 illustrates a more specific embodiment of the present disclosure. As shown in FIG. 2, the distance measurement method in some embodiments includes obtaining an image of a target device, the image of the target device comprising a target object of a first color and a background object of a second color, the first color being different from the second color; processing the image of the target device to obtain a processed image, the processed image comprising a processed target object of a third color and a processed background object of a fourth color; detecting a contour of the processed target object of the third color; calculating an area encircled by the contour; and calculating a distance between a camera and the target device upon determination of the area encircled by the contour.

The target device may be any suitable device having portions that have color contrast. For example, the target device may be a simple handheld object having a target portion and a background portion, the target portion and the background portion being adjacent to each other and have color contrast. In one example, the target portion may be of a gray color and the background portion may be of a blue color. Optionally, the target portion is at least partially surrounded by the background portion.

In some embodiments, the target device has additional functions other than providing the target portion and the background portion having color contrast. In one example, the target device may be a remote control configured to control the camera for capturing an image of the target device and/or the subject holding the target device.

Figure 3A:
FIG. 3A shows an image of a target device in some embodiments according to the present disclosure.
Figure 3B:
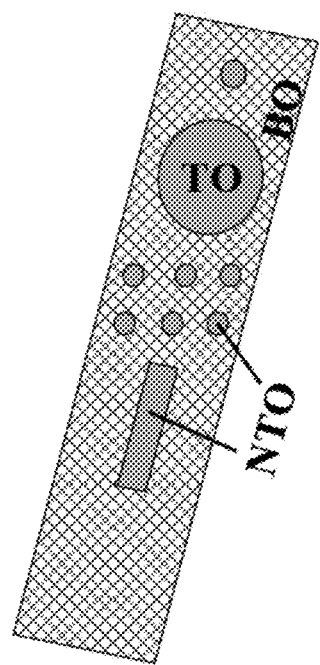
FIG. 3B is a zoom-in view of an image of a target device in some embodiments according to the present disclosure.

FIG. 3A shows an image of a target device in some embodiments according to the present disclosure. FIG. 3B is a zoom-in view of an image of a target device in some embodiments according to the present disclosure. Referring to FIG. 3A and FIG. 3B, the method in some embodiments includes obtaining an image of a target device TD, the image of the target device TD comprising a target object TO of a first color and a background object BO of a second color. The first color and the second color are two different colors. In some embodiments, the first color and the second color are two different colors having high color contrast. In one example, the target object TO is of a gray color and the background object BO is of a blue color. As shown in FIG. 3A and FIG. 3B, the image of the target device TD in some embodiments further includes one or more non-target object NTO. In one example, the one or more non-target object NTO are of the first color. In another example, the one or more non-target object NTO are of a color different from the first color. In another example, the one or more non-target object NTO are of a color different from the second color.

In some embodiments, the method further includes processing the image of the target device to obtain a processed image. Any suitable image processing processes may be implemented in the present method. For example, the suitable image processing processes may include cropping an original image. In one example, the suitable image processing processes may include enhancing resolution and/or details of an image. In another example, the suitable image processing processes may include denoising an image. In another example, the suitable image processing processes may include enhancing the contrast between the target object and the background object in order to facilitate detection of a contour of the target object.

In some embodiments, the method further includes processing the image of the target device to obtain a processed image having a processed target object of a third color and a processed background object of a fourth color. The third color and the fourth color are two different colors. Optionally, the third color and the fourth color are two different colors having high color contrast.

Optionally, the third color is the same as the first color. Optionally, the fourth color is the same as the second color.

Optionally, the third color is different from the first color. Optionally, the fourth color is different from the second color.

Figure 4A:
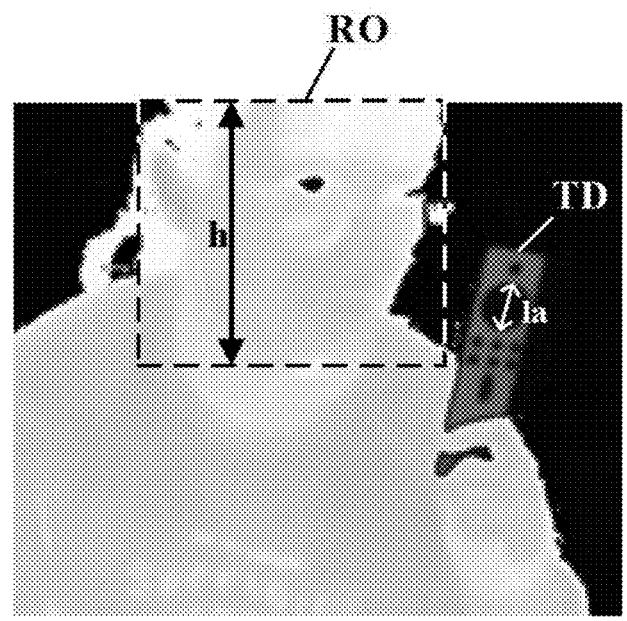
FIG. 4A shows a processed image in some embodiments according to the present disclosure.
Figure 4B:
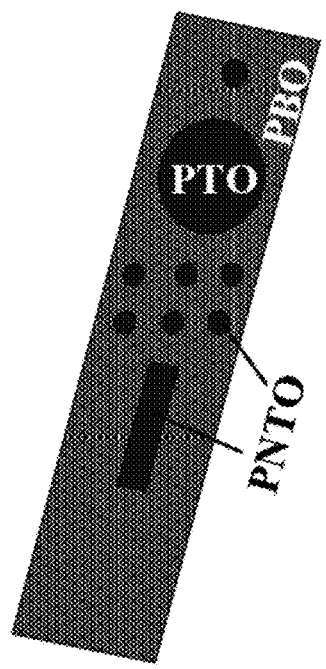
FIG. 4B is a zoom-in view of a processed image in some embodiments according to the present disclosure.

FIG. 4A shows a processed image in some embodiments according to the present disclosure. FIG. 4B is a zoom-in view of a processed image in some embodiments according to the present disclosure. Referring to FIG. 4A and FIG. 4B, in some embodiments, processing the image of the target device comprises performing a grayscale processing on the image of the target device TD. As used herein, the term "grayscale processing" refers to a process converting a color image into a grayscale image. As used herein, the term "grayscale image" refers to an image which the value of each pixel contains only intensity information. In FIG. 3A and FIG. 3B, pixels of the image are of true colors (non-grayscale colors), for example, the target object TO is of a gray color and the background object BO is of a blue color. As shown in FIG. 4A and FIG. 4B, pixels of the processed image are of grayscale colors. e.g., including various shades of gray ranging from white or near white to black or near black, but without chromatic variation. The third color and the fourth color are of two different grayscale colors having two different shades of gray; whereas the first color and the second color are of two different true colors.

In some embodiments, processing the image of the target device includes obtaining color component values in a color space of a pixel data of the image of the target device; converting the color component values into converted color component values based on a first conversion algorithm. In one example, the color space is a RGB color space, and the color components of the pixel data in the RGB color space include a red color component, a green color component, and a blue color component.

Various suitable conversion algorithms may be used for converting the color component values of the pixel data into converted color component values. In some embodiments, the first conversion algorithm enhances the contrast (e.g., color contrast) between the target portion and the background portion. In one example, by applying the first conversion algorithm, a first color contrast between the third color of the processed target object PTO and the fourth color of the processed background object PBO is enhanced with respect to a second color contrast between the first color of the target object TO (as depicted in FIG. 3B) and the second color of the background object BO (as depicted in FIG. 3B). In another example, by applying the first conversion algorithm, a first pixel intensity contrast between the pixel data of the processed target object PTO and the pixel data of the processed background object PBO is enhanced with respect to a second pixel intensity contrast between the pixel data of the target object TO and the pixel data of the background object BO. In another example, by applying the first conversion algorithm, a first color contrast between the third color of the processed target object PTO and the fourth color of the processed background object PBO is enhanced with respect to a second color contrast between the first color of the target object TO and the second color of the background object BO; and a first pixel intensity contrast between the pixel data of the processed target object PTO and the pixel data of the processed background object PBO is enhanced with respect to a second pixel intensity contrast between the pixel data of the target object TO and the pixel data of the background object BO.

In some embodiments, the color component values of the pixel data include a first color component value and a second color component value. Optionally, the color component values of the pixel data further include a third color component value. In some embodiments, the first conversion algorithm includes subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

In one specific example, the color space is a RGB color space, and the first color component value is a color component value of a blue color, and the second color component value is a color component value of a red color. The first conversion algorithm includes subtracting the red color component value of the pixel data from the blue color component value of the pixel data to obtain a subtracted value; and assigning an absolute value of the subtracted value as a color component value for each color component of the pixel data, thereby obtaining the converted color component values of the processed image.

To illustrate, in one example, the target object TO is of a gray color and the background object BO is of a blue color. In a pixel data of a gray color (e.g., for the target object TO), the red color component value and the blue color component value are relatively close to each other, as compared to a pixel data of a blue color (for the background object BO). In one specific example, color component values of the pixel data of a gray color (e.g., for the target object TO) can be represented as (128, 128, 128). By applying the first conversion algorithm, the converted color component values of the processed target object PTO can be represented as (0, 0.0), which is a black color. Color component values of the pixel data of a blue color (for the background object PBO) can be represented as (0, 0, 175). By applying the first conversion algorithm, the converted color component values of the processed background object PBO can be represented as (175, 175, 175), which is a gray color. As illustrated in FIG. 3A. FIG. 3B, FIG. 4A, and FIG. 4B, by applying the first conversion algorithm, a first color contrast between the third color (black; (0, 0, 0)) of the processed target object PTO and the fourth color (gray; (175, 175, 175)) of the processed background object PBO is enhanced with respect to a second color contrast between the first color (gray; (128, 128, 128)) of the target object TO and the second color (blue; (0, 0, 175)) of the background object BO.

In another specific example, the color space is a RGB color space, and the first color component value is a color component value of a red color, and the second color component value is a color component value of a blue color. The first conversion algorithm includes subtracting the blue color component value of the pixel data from the red color component value of the pixel data to obtain a subtracted value; and assigning an absolute value of the subtracted value as a color component value for each color component of the pixel data, thereby obtaining the converted color component values of the processed image.

To illustrate, in one example, the target object TO is of a black color and the background object BO is of a red color. In a pixel data of a black color (e.g., for the target object TO), the red color component value and the blue color component value are relatively close to each other, as compared to a pixel data of a red color (for the background object BO). In one specific example, color component values of the pixel data of a black color (e.g., for the target object TO) can be represented as (0, 0, 0). By applying the first conversion algorithm, the converted color component values of the processed target object PTO can be represented as (0, 0, 0), which is still a black color. Color component values of the pixel data of a red color (for the background object PBO) can be represented as (255, 0, 0). By applying the first conversion algorithm, the converted color component values of the processed background object PBO can be represented as (255, 255, 255), which is a white color. By applying the first conversion algorithm, a first color contrast between the third color (black; (0, 0, 0)) of the processed target object PTO and the fourth color (white; (255, 255, 255)) of the processed background object PBO is enhanced with respect to a second color contrast between the first color (black; (0, 0, 0)) of the target object TO and the second color (red; (255, 0, 0)) of the background object BO.

In some embodiments, the color component values of the pixel data include a first color component value and a second color component value. Optionally, the color component values of the pixel data further include a third color component value. In some embodiments, the first conversion algorithm includes assigning the first color component value of the pixel data as a color component value for each color component of the pixel data, thereby obtaining the converted color component values of the processed image.

In one specific example, the color space is a RGB color space, and the first color component value is a color component value of a green color, the second color component value is a color component value of a red color, and the third color component value is a color component value of a blue color. The first conversion algorithm includes assigning the green color component value of the pixel data as a color component value for each color component of the pixel data, thereby obtaining the converted color component values of the processed image.

To illustrate, in one example, the target object TO is of a blue color and the background object BO is of a green color. In one specific example, color component values of the pixel data of a blue color (e.g., for the target object TO) can be represented as (0, 0, 175). By applying the first conversion algorithm, the converted color component values of the processed target object PTO can be represented as (0, 0, 0), which is a black color. Color component values of the pixel data of a green color (for the background object PBO) can be represented as (0, 175, 0). By applying the first conversion algorithm, the converted color component values of the processed background object PBO can be represented as (175, 175, 175), which is a gray color. By applying the first conversion algorithm, a first color contrast between the third color (black; (0, 0, 0)) of the processed target object PTO and the fourth color (gray; (175, 175, 175)) of the processed background object PBO is enhanced with respect to a second color contrast between the first color (blue; (0, 0, 175)) of the target object TO and the second color (green; (0, 175, 0)) of the background object BO.

In some embodiments, referring to FIG. 2, the method further includes detecting a contour of the processed target object of the third color. Various suitable detection algorithm may be used for detecting the contour of the processed target object of the third color. In some embodiments, detecting the contour of the processed target object of the third color includes first detecting a shape of the processed target object; and assigning an edge of the detected shape as the contour of the processed target object of the third color.

In some embodiments, the method includes applying a shape detection algorithm to detect at least one object in the processed image having a target shape. Referring to FIG. 4B, the target shape in one example is an elliptical shape (or a circular shape), and the shape detection algorithm is an elliptical shape detection algorithm (or a circular shape detection algorithm). By applying the elliptical shape detection algorithm (e.g., an elliptical Hough transform algorithm), at least one object (e.g., the processed target object PTO) in the processed image having a target shape (e.g., an elliptical shape) may be detected. Because the algorithm may detect multiple objects all having the target shape, it is necessary to ensure a detected object having the target shape is the processed target object PTO.

In this regard, the method may utilize a reference object in the processed target image to validate a detected object having the target shape being the processed target object PTO. Referring to FIG. 4A and FIG. 4B, the processed target image in some embodiments includes a processed target object PTO, a processed background object PBO, one or more processed non-target objects PNTO, and a reference object RO. In one example, the reference object RO may be a facial image object of a subject holding the target device TD. To illustrate, in one specific example, a plurality of objects having the target shape are detected upon applying the shape detection algorithm. For example, referring to FIG. 4B, the processed target object PTO and at least one of the one or more processed non-target object PNTO have an elliptical shape (the target shape). In order to determine an object from the at least one object as the processed target object, the method further includes calculating aspect ratios respectively of the plurality of objects having the target shape with respect to a reference object RO in the processed image.

In one specific example, the aspect ratio may be calculated using a height h of the reference object RO and a length of a selected dimension of the detected object. For example, the aspect ratio may be calculated as a ratio of a long axis length la of an elliptical shape of the detected object to a height h of the reference object RO. Optionally, determining an object from the at least one object as the processed target object includes selecting an object having an aspect ratio with respect to the reference object RO in a target range as the processed target object PTO.

Various appropriate target shapes may be implemented in the present method. Examples of suitable target shapes include an elliptical shape, a circular shape, a rectangular shape, a square shape, a triangular shape, a pentagonal shape, a hexagonal shape, and a polygonal shape. In one example, the target shape is a rectangular shape, and applying the shape detection algorithm may include detection four sides of the rectangular shape using, e.g., line segment detection method, thereby detecting the rectangular shape. Optionally, the aspect ratio may be calculated as a ratio of a length of a long side of the rectangular shape of the detected object to a height h of the reference object RO.

In some embodiments, based on the shape detection algorithm, the method includes generate an edge image of the processed target object PTO, for example, by Laplacian transform, the Sobel method, the Canny method, and so on. Upon the generation of the edge map, the method further includes extracting line segments and/or arcs from the generated edge map, for example, using the line segment detection (LSD) method and/or Hough transform method.

Figure 5A:
FIG. 5A shows detection of a contour of a processed target object in some embodiments according to the present disclosure.
Figure 5B:
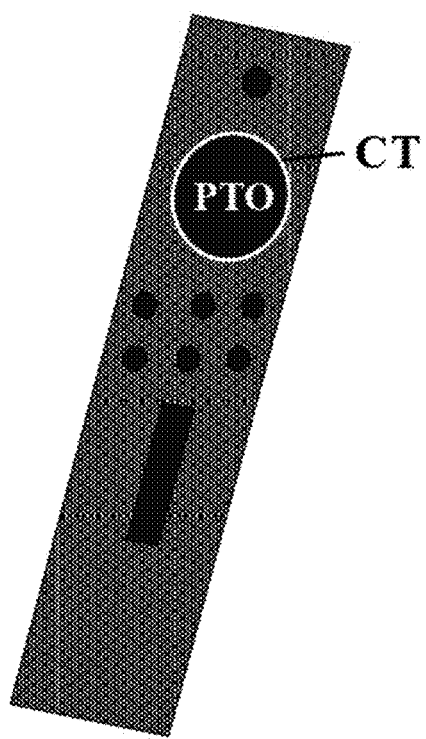
FIG. 5B is a zoom-in view of a processed image having a contour of a processed target object detected in some embodiments according to the present disclosure.

FIG. 5A shows detection of a contour of a processed target object in some embodiments according to the present disclosure. FIG. 5B is a zoom-in view of a processed image having a contour of a processed target object detected in some embodiments according to the present disclosure. As shown in FIG. 5A and FIG. 5B, subsequent to applying the shape detection algorithm to detect at least one object in the processed image having a target shape, and determining an object from the at least one object as the processed target object, the method further includes assigning an edge of the detected shape as the contour CT of the processed target object PTO.

Once the contour CT of the processed target object PTO is determined, referring to FIG. 2, the method in some embodiments further includes calculating an area encircled by the contour CT. Various appropriate area calculation algorithms may be implemented in the present method. For example, the area of the target shape may be assigned as the area of encircled by the contour.

In some embodiments, the present method utilizes a unique and more accurate algorithm for calculating the area encircled by the contour. In some embodiment, the algorithm includes selecting one or more pixels as seeds for region growing; growing a respective seeded region comprising a respective seed in an iterative fashion, wherein, at each iteration, pixels adjacent to the respective seeded region are evaluated by a threshold criteria, and one or more pixel that satisfy the threshold criteria are appended into the respective seeded region; and generating a segmented image when all pixels in the processed image are assigned into their respective seeded regions. The segmented image includes a plurality of seeded regions, one of which ("target seeded region") corresponds to the area encircled by the contour. The area encircled by the contour may be calculated by counting a total number of pixels in the target seeded region. Various suitable image segmentation techniques may be implemented in the present method. Examples of suitable image segmentation techniques include OSTU algorithm and adaptive thresholding algorithm.

Figure 6A:
FIG. 6A shows an area encircled by a contour of a processed target object in some embodiments according to the present disclosure.
Figure 6B:
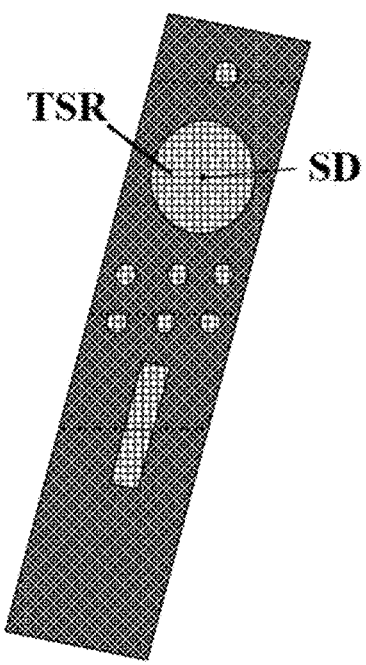
FIG. 6B is a zoom-in view of a processed image showing an area encircled by a contour of a processed target object in some embodiments according to the present disclosure.

In some embodiments, selecting one or more pixels as seeds for region growing includes selecting a geometrical center of the target shape as a seed. An area of a seeded region including the geometrical center of the target shape as the seed in the segmented image is determined as the area encircled by the contour. FIG. 6A shows an area encircled by a contour of a processed target object in some embodiments according to the present disclosure. FIG. 6B is a zoom-in view of a processed image showing an area encircled by a contour of a processed target object in some embodiments according to the present disclosure. As shown in FIG. 6B, a target seeded region TSR grown from a seed SD at the geometrical center of the target shape is determined in a segmented image shown in FIG. 6B. An area of the target seeded region TSR including the geometrical center of the target shape as the seed in the segmented image is determined as the area encircled by the contour.

Referring to FIG. 2, the method in some embodiments further includes calculating a distance between a camera and the target device upon determination of the area encircled by the contour. In some embodiments, calculating the distance between the camera and the target device upon determination of the area encircled by the contour comprises calculating the distance between the camera and the target device based on a second conversion algorithm. Optionally, the second conversion algorithm can be expressed as:

$$D = \frac{k}{\sqrt{A + d1 + d2}};$$

wherein D stands for the distance between the camera and the target device, A stands for the area encircled by the contour, k, d1, and d2 are predetermined fitted parameters.

In some embodiments, the method further includes calibrating the second conversion algorithm to determine k, d1, and d2 using a reference distance between the camera and the target device and a reference area encircled by the contour corresponding to the reference distance. In one example, the subject holding the target device may be standing at a number of predetermined distances (e.g., 1.0 m, 1.2 m, 1.4 m, . . . , or 2.8 m) from the camera, and areas encircled by contour of the processed target object respectively corresponding to the predetermined distances are calculated, thereby obtaining a database containing distance data and area data. In one example, a least-square method may be utilized to fit the parameters k, d1, and d2.

In the present method, the calibration method described above needs to be performed just once, and the predetermined fitted parameters and the second conversion algorithm are generally applicable for all subjects. Alternatively, the calibration may be performed in real time for each individual subject. For example, the calibration may be performed based on inter-pupil distance of the individual subject. Because different individuals have different inter-pupil distances, the fitted parameters determined for one individual may not be suitable for a different individual. The calibration method described above obviates the shortcomings of subject-specific calibration methods, making the present distance measurement method highly convenient for the user.

In some embodiments, the image of the target device may be a pre-processed image. In some embodiments, obtaining the image of the target device includes obtaining an original image captured by the camera; determining presence or absence of a reference object in the original image; upon a determination that the reference object is present in the original image, cropping the original image around the reference object by a margin of m times of a size of the reference object, thereby obtaining the image of the target device. Optionally, m≥2. Optionally, m=3. The image of the target device includes the target object, the background object, and the reference object.

In some embodiments, the method further includes capturing an original image of the target device using the camera.

To further enhance accuracy of the distance measurement, the present method may be performed using several frames of images. For each frame of image, a distance may be measured according to the method described above. Moreover, to provide a smoothing effect on distance measurement, the method in some embodiments further includes caching the distance calculated for each frame of image in a cache, and averaging several cached distances respectively from several frames of images. In one example, the method includes caching the distance between the camera and the target device as a presently cached distance; and averaging the presently cached distance and N number of historically cached distances to obtain an averaged distance. Optionally, N≥1, e.g., 1, 2, 3, 4, 5, 6, 7, 8, 9, or 10. Optionally, N=9.

Figure 7:
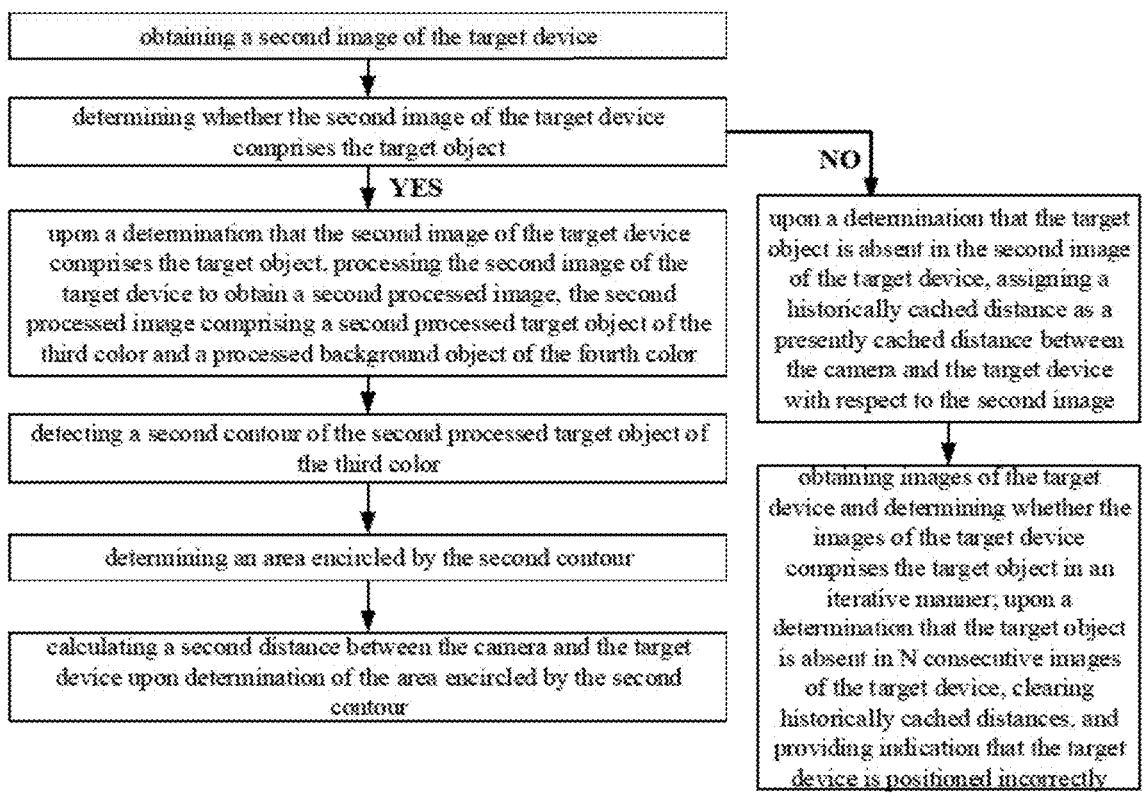
FIG. 7 is a flowchart of a distance measurement method in some embodiments according to the present disclosure.

FIG. 7 is a flowchart of a distance measurement method in some embodiments according to the present disclosure. Referring to FIG. 7, the method in some embodiments further includes obtaining a second image of the target device; determining whether the second image of the target device comprises the target object. Optionally, the second image of the target device is a next consecutively captured image. When it is determined that the second image of the target device comprises the target object, the method further includes calculating a second distance between the camera and the target device. Specifically, and referring to FIG. 7, upon a determination that the second image of the target device comprises the target object, the method further includes processing the second image of the target device to obtain a second processed image, the second processed image comprising a second processed target object of the third color and a processed background object of the fourth color; detecting a second contour of the second processed target object of the third color; determining an area encircled by the second contour; and calculating a second distance between the camera and the target device upon determination of the area encircled by the second contour. Optionally, the second distance is cached as a presently cached distance, and it was averaged with one or more historically cached distances to obtain an averaged distance.

When it is determined that the target object is absent in the second image of the target device, the method further includes assigning a historically cached distance as a presently cached distance between the camera and the target device with respect to the second image. Optionally, an immediately adjacent historically cached distance (derived from an immediate previously captured original image) is assigned as the presently cached distance between the camera and the target device with respect to the second image.

In some embodiments, the method further includes obtaining images of the target device and determining whether the images of the target device comprises the target object in an iterative manner. Upon a determination that the target object is absent in N consecutive images of the target device, the method further includes clearing historically cached distances, N being a positive integer. Optionally, N≥2, e.g., 2, 3, 4, 5, 6, 7, 8, 9, or 10. Optionally, N=10. Optionally, upon a determination that the target object is absent in N consecutive images of the target device, the method further includes providing indication that the target device is positioned incorrectly (e.g., incorrectly held by the subject). Optionally, upon a determination that the target object is absent in N consecutive images of the target device, the method further includes providing instructions to the subject on how to adjust gesture of holding the target device.

Figure 8:
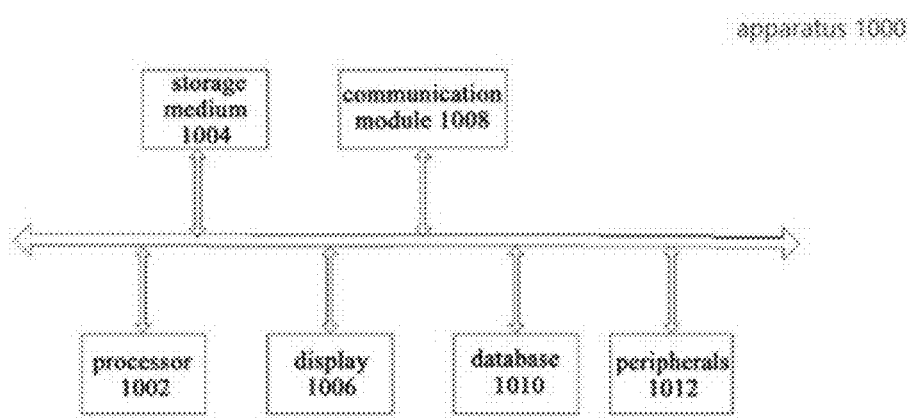
FIG. 8 is a block diagram of an apparatus in some embodiments according to the present disclosure.

In another aspect, the present disclosure provides an apparatus. FIG. 8 is a block diagram of an apparatus in some embodiments according to the present disclosure. Referring to FIG. 8, in some embodiments, the apparatus 1000 may include any appropriate type of TV, such as a plasma TV, a liquid crystal display (LCD) TV, a touch screen TV, a projection TV, a non-smart TV, a smart TV, etc. The apparatus 1000 may also include other computing systems, such as a personal computer (PC), a tablet or mobile computer, or a smart phone, etc. In addition, the apparatus 1000 may be any appropriate content-presentation device capable of presenting any appropriate content. Users may interact with the dynamic volumetric display apparatus 1000 to perform other activities of interest.

As shown in FIG. 8, the apparatus 1000 may include a processor 1002, a storage medium 1004, a display 1006, a communication module 1008, a database 1010 and peripherals 1012. Certain devices may be omitted and other devices may be included to better describe the relevant embodiments.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storage, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display device or electronic apparatus display such as LCD or OLED based devices. The peripherals 112 may include various sensors and other I/O devices, such as keyboard and mouse.

It will be understood by one of ordinary skill in the art that all or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information and which may accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

In some embodiments, the apparatus includes a memory, and one or more processors, wherein the memory and the one or more processors are connected with each other. In some embodiments, the memory stores computer-executable instructions for controlling the one or more processors to obtain an image of a target device, the image of the target device comprising a target object of a first color and a background object of a second color; process the image of the target device to obtain a processed image, the processed image comprising a processed target object of a third color and a processed background object of a fourth color; detect a contour of the processed target object of the third color; calculate an area encircled by the contour; and calculate a distance between a camera and the target device upon determination of the area encircled by the contour. Optionally, the distance measurement apparatus further includes the target device having a target portion of the first color and a background portion of the second color. Optionally, the distance measurement apparatus further includes a camera for capturing an original image of a target device.

In some embodiments, the memory further stores computer-executable instructions for controlling the one or more processors to perform a grayscale processing on the image of the target device, thereby processing the image of the target device.

In some embodiments, the memory further stores computer-executable instructions for controlling the one or more processors to obtain color component values in a color space of a pixel data of the image of the target device; and convert the color component values into converted color component values based on a first conversion algorithm; thereby processing the image of the target device.

In some embodiments, the color component values of the pixel data include a first color component value and a second color component value. Optionally, according to the first conversion algorithm, the memory further stores computer-executable instructions for controlling the one or more processors to subtract the second color component value of the pixel data from the first color component value of the pixel data to obtain a subtracted value; and assign an absolute value of the subtracted value as a color component value for each color component of the pixel data, thereby obtaining the converted color component values of the processed image.

In some embodiments, the color component values of the pixel data include a first color component value, a second color component value, and a third color component value. Optionally, according to the first conversion algorithm, the memory further stores computer-executable instructions for controlling the one or more processors to assign the first color component value of the pixel data as a color component value for each color component of the pixel data, thereby obtaining the converted color component values of the processed image.

In some embodiments, the memory further stores computer-executable instructions for controlling the one or more processors to, prior to detecting the contour of the processed target object of the third color, apply a shape detection algorithm to detect at least one object in the processed image having a target shape; and determine an object from the at least one object as the processed target object.

In some embodiments, a plurality of objects having the target shape are detected upon applying the shape detection algorithm. Optionally, the memory further stores computer-executable instructions for controlling the one or more processors to calculate aspect ratios respectively of the plurality of objects having the target shape with respect to a reference object in the processed image; and select an object having an aspect ratio with respect to the reference object in a target range as the processed target object, thereby determining an object from the at least one object as the processed target object.

Optionally, the reference object is a facial image object of a subject.

In some embodiments, the memory further stores computer-executable instructions for controlling the one or more processors to select one or more pixels as seeds for region growing; grow a respective seeded region comprising a respective seed in an iterative fashion, wherein, at each iteration, pixels adjacent to the respective seeded region are evaluated by a threshold criteria, and one or more pixel that satisfy the threshold criteria are appended into the respective seeded region; and generate a segmented image when all pixels in the processed image are assigned into their respective seeded regions.

In some embodiments, the memory further stores computer-executable instructions for controlling the one or more processors to apply a shape detection algorithm to detect at least one object in the processed image having a target shape; and select a geometrical center of the target shape as a seed. Optionally, an area of a seeded region including the geometrical center of the target shape as the seed in the segmented image is determined as the area encircled by the contour.

In some embodiments, the memory further stores computer-executable instructions for controlling the one or more processors to calculate the distance between the camera and the target device based on a second conversion algorithm, thereby calculating the distance between the camera and the target device upon determination of the area encircled by the contour.

Optionally, the second conversion algorithm can be expressed as:

$$D = \frac{k}{\sqrt{A + d1 + d2}};$$

wherein D stands for the distance between the camera and the target device, A stands for the area encircled by the contour, k, d1, and d2 are predetermined fitted parameters.

In some embodiments, the memory further stores computer-executable instructions for controlling the one or more processors to cache the distance between the camera and the target device as a presently cached distance; and average the presently cached distance and one or more historically cached distances to obtain an averaged distance.

In some embodiments, the memory further stores computer-executable instructions for controlling the one or more processors to obtain a second image of the target device; and determine whether the second image of the target device comprises the target object.

In some embodiments, the memory further stores computer-executable instructions for controlling the one or more processors to, upon a determination that the second image of the target device comprises the target object, process the second image of the target device to obtain a second processed image, the second processed image comprising a second processed target object of the third color and a processed background object of the fourth color; detect a second contour of the second processed target object of the third color; determine an area encircled by the second contour; and calculate a second distance between the camera and the target device upon determination of the area encircled by the second contour.

In some embodiments, the memory further stores computer-executable instructions for controlling the one or more processors to, upon a determination that the target object is absent in the second image of the target device, assign a historically cached distance as a presently cached distance between the camera and the target device with respect to the second image.

In some embodiments, the memory further stores computer-executable instructions for controlling the one or more processors to obtain images of the target device and determine whether the images of the target device comprises the target object in an iterative manner. Optionally, the memory further stores computer-executable instructions for controlling the one or more processors to, upon a determination that the target object is absent in N consecutive images of the target device, clear historically cached distances, and provide indication that the target device is positioned incorrectly.

In some embodiments, the memory further stores computer-executable instructions for controlling the one or more processors to obtain an original image captured by the camera; determine presence or absence of a reference object in the original image; upon a determination that the reference object is present in the original image, crop the original image around the reference object by a margin of in times of a size of the reference object, thereby obtaining the image of the target device. Optionally, the image of the target device includes the target object, the background object, and the reference object.

In another aspect, the present disclosure provides a computer-program product including a non-transitory tangible computer-readable medium having computer-readable instructions thereon. In some embodiments, the computer-readable instructions being executable by a processor to cause the processor to perform obtaining an image of a target device, the image of the target device comprising a target object of a first color and a background object of a second color; processing the image of the target device to obtain a processed image, the processed image comprising a processed target object of a third color and a processed background object of a fourth color; detecting a contour of the processed target object of the third color; calculating an area encircled by the contour; and calculating a distance between a camera and the target device upon determination of the area encircled by the contour.

In some embodiments, the computer-readable instructions are executable by a processor to cause the processor to further perform a grayscale processing on the image of the target device, thereby processing the image of the target device.

In some embodiments, the computer-readable instructions are executable by a processor to cause the processor to further perform obtaining color component values in a color space of a pixel data of the image of the target device; and converting the color component values into converted color component values based on a first conversion algorithm, thereby processing the image of the target device.

In some embodiments, the color component values of the pixel data comprise a first color component value and a second color component value. Optionally, according to the first conversion algorithm, the computer-readable instructions are executable by a processor to cause the processor to further perform subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

In some embodiments, the color component values of the pixel data comprise a first color component value, a second color component value, and a third color component value. Optionally, according to the first conversion algorithm, the computer-readable instructions are executable by a processor to cause the processor to further perform assigning the first color component value of the pixel data as a color component value for each color component of the pixel data, thereby obtaining the converted color component values of the processed image.

In some embodiments, prior to detecting the contour of the processed target object of the third color, the computer-readable instructions are executable by a processor to cause the processor to further perform, applying a shape detection algorithm to detect at least one object in the processed image having a target shape; and determining an object from the at least one object as the processed target object.

In some embodiments, a plurality of objects having the target shape are detected upon applying the shape detection algorithm. Optionally, the computer-readable instructions are executable by a processor to cause the processor to further perform calculating aspect ratios respectively of the plurality of objects having the target shape with respect to a reference object in the processed image; and selecting an object having an aspect ratio with respect to the reference object in a target range as the processed target object, thereby determining an object from the at least one object as the processed target object. Optionally, the reference object is a facial image object of a subject.

In some embodiments, the computer-readable instructions are executable by a processor to cause the processor to further perform selecting one or more pixels as seeds for region growing; growing a respective seeded region comprising a respective seed in an iterative fashion, wherein, at each iteration, pixels adjacent to the respective seeded region are evaluated by a threshold criteria, and one or more pixel that satisfy the threshold criteria are appended into the respective seeded region; and generating a segmented image when all pixels in the processed image are assigned into their respective seeded regions, thereby calculating the area encircled by the contour.

In some embodiments, the computer-readable instructions are executable by a processor to cause the processor to further perform applying a shape detection algorithm to detect at least one object in the processed image having a target shape; and selecting a geometrical center of the target shape as a seed, thereby selecting one or more pixels as seeds for region growing. Optionally, an area of a seeded region comprising the geometrical center of the target shape as the seed in the segmented image is determined as the area encircled by the contour.

In some embodiments, the computer-readable instructions are executable by a processor to cause the processor to further perform calculating the distance between the camera and the target device based on a second conversion algorithm, thereby calculating the distance between the camera and the target device upon determination of the area encircled by the contour.

Optionally, the second conversion algorithm can be expressed as:

$$D = \frac{k}{\sqrt{A + d1 + d2}};$$

wherein D stands for the distance between the camera and the target device, A stands for the area encircled by the contour, k, d1, and d2 are predetermined fitted parameters.

In some embodiments, the computer-readable instructions are executable by a processor to cause the processor to further perform caching the distance between the camera and the target device as a presently cached distance; and averaging the presently cached distance and one or more historically cached distances to obtain an averaged distance.

In some embodiments, the computer-readable instructions are executable by a processor to cause the processor to further perform obtaining a second image of the target device; determining whether the second image of the target device comprises the target object.

In some embodiments, upon a determination that the second image of the target device comprises the target object, the computer-readable instructions are executable by a processor to cause the processor to further perform processing the second image of the target device to obtain a second processed image, the second processed image comprising a second processed target object of the third color and a processed background object of the fourth color; detecting a second contour of the second processed target object of the third color; determining an area encircled by the second contour; and calculating a second distance between the camera and the target device upon determination of the area encircled by the second contour.

In some embodiments, upon a determination that the target object is absent in the second image of the target device, the computer-readable instructions are executable by a processor to cause the processor to further perform assigning a historically cached distance as a presently cached distance between the camera and the target device with respect to the second image.

In some embodiments, the computer-readable instructions are executable by a processor to cause the processor to further perform obtaining images of the target device and determining whether the images of the target device comprises the target object in an iterative manner. Upon a determination that the target object is absent in N consecutive images of the target device, the computer-readable instructions are executable by a processor to cause the processor to further perform clearing historically cached distances, and providing indication that the target device is positioned incorrectly.

In some embodiments, the computer-readable instructions are executable by a processor to cause the processor to further perform obtaining an original image captured by the camera; determining presence or absence of a reference object in the original image; upon a determination that the reference object is present in the original image, cropping the original image around the reference object by a margin of m times of a size of the reference object, thereby obtaining the image of the target device. Optionally, the image of the target device includes the target object, the background object, and the reference object.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A distance measurement method, comprising:
obtaining an image of a target device, the image of the target device comprising a target object of a first color and a background object of a second color, the first color being different from the second color;
processing the image of the target device to obtain a processed image, the processed image comprising a processed target object of a third color and a processed background object of a fourth color;
detecting a contour of the processed target object of the third color;
calculating an area encircled by the contour; and
calculating a distance between a camera and the target device upon determination of the area encircled by the contour;
wherein processing the image of the target device comprises:
obtaining color component values in a color space of a pixel data of the image of the target device; and
converting the color component values into converted color component values based on a first conversion algorithm;
wherein the color component values of the pixel data comprise a first color component value and a second color component value;
wherein the first conversion algorithm comprises:

subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

2. The distance measurement method of claim 1, wherein processing the image of the target device comprises performing a grayscale processing on the image of the target device.

3. A distance measurement method, comprising:
obtaining an image of a target device, the image of the target device comprising a target object of a first color and a background object of a second color, the first color being different from the second color;
processing the image of the target device to obtain a processed image, the processed image comprising a processed target object of a third color and a processed background object of a fourth color;
detecting a contour of the processed target object of the third color;
calculating an area encircled by the contour; and
calculating a distance between a camera and the target device upon determination of the area encircled by the contour;
wherein processing the image of the target device comprises:
obtaining color component values in a color space of a pixel data of the image of the target device; and
converting the color component values into converted color component values based on a first conversion algorithm;
wherein the color component values of the pixel data comprise a first color component value, a second color component value, and a third color component value;
wherein the first conversion algorithm comprises assigning the first color component value of the pixel data as a color component value for each color component of the pixel data, thereby obtaining the converted color component values of the processed image.

4. The distance measurement method of claim 1, prior to detecting the contour of the processed target object of the third color, further comprising:
applying a shape detection algorithm to detect at least one object in the processed image having a target shape; and
determining an object from the at least one object as the processed target object.

5. A distance measurement method, comprising:
obtaining an image of a target device, the image of the target device comprising a target object of a first color and a background object of a second color, the first color being different from the second color;
processing the image of the target device to obtain a processed image, the processed image comprising a processed target object of a third color and a processed background object of a fourth color;
detecting a contour of the processed target object of the third color;
calculating an area encircled by the contour;
calculating a distance between a camera and the target device upon determination of the area encircled by the contour;
wherein, prior to detecting the contour of the processed target object of the third color, the distance measurement method further comprises:

applying a shape detection algorithm to detect at least one object in the processed image having a target shape; and
determining an object from the at least one object as the processed target object;
wherein a plurality of objects having the target shape are detected upon applying the shape detection algorithm;
wherein the distance measurement method further comprises calculating aspect ratios respectively of the plurality of objects having the target shape with respect to a reference object in the processed image; and
wherein determining an object from the at least one object as the processed target object comprises selecting an object having an aspect ratio with respect to the reference object in a target range as the processed target object.

6. The distance measurement method of claim 5, wherein the reference object is a facial image object of a subject.

7. The distance measurement method of claim 1, wherein calculating the area encircled by the contour comprises:
selecting one or more pixels as seeds for region growing;
growing a respective seeded region comprising a respective seed in an iterative fashion, wherein, at each iteration, pixels adjacent to the respective seeded region are evaluated by a threshold criteria, and one or more pixel that satisfy the threshold criteria are appended into the respective seeded region; and
generating a segmented image when all pixels in the processed image are assigned into their respective seeded regions.

8. The distance measurement method of claim 7, further comprising applying a shape detection algorithm to detect at least one object in the processed image having a target shape;
wherein selecting one or more pixels as seeds for region growing comprises selecting a geometrical center of the target shape as a seed; and
an area of a seeded region comprising the geometrical center of the target shape as the seed in the segmented image is determined as the area encircled by the contour.

9. The distance measurement method of claim 1, wherein calculating the distance between the camera and the target device upon determination of the area encircled by the contour comprises calculating the distance between the camera and the target device based on a second conversion algorithm.

10. The distance measurement method of claim 9, wherein the second conversion algorithm is:

$$D = \frac{k}{\sqrt{A+d1+d2}};$$

wherein D stands for the distance between the camera and the target device, A stands for the area encircled by the contour, k, d1, and d2 are predetermined fitted parameters.

11. The distance measurement method of claim 10, further comprising calibrating the second conversion algorithm to determine k, d1, and d2 using a reference distance between the camera and the target device and a reference area encircled by the contour corresponding to the reference distance.

12. The distance measurement method of claim 1, further comprising:

caching the distance between the camera and the target device as a presently cached distance; and averaging the presently cached distance and one or more historically cached distances to obtain an averaged distance.

13. The distance measurement method of claim 1, further comprising:

obtaining a second image of the target device; and determining whether the second image of the target device comprises the target object.

14. The distance measurement method of claim 13, upon a determination that the second image of the target device comprises the target object, further comprising:

processing the second image of the target device to obtain a second processed image, the second processed image comprising a second processed target object of the third color and a processed background object of the fourth color;

detecting a second contour of the second processed target object of the third color;

determining an area encircled by the second contour; and calculating a second distance between the camera and the target device upon determination of the area encircled by the second contour.

15. The distance measurement method of claim 13, upon a determination that the target object is absent in the second image of the target device, further comprising:

assigning a historically cached distance as a presently cached distance between the camera and the target device with respect to the second image.

16. The distance measurement method of claim 13, further comprising:

obtaining images of the target device and determining whether the images of the target device comprises the target object in an iterative manner; and upon a determination that the target object is absent in N consecutive images of the target device, clearing historically cached distances, and providing indication that the target device is positioned incorrectly, N≥2, N being an integer.

17. A distance measurement apparatus, comprising:

a memory;

one or more processors;

wherein the memory and the one or more processors are connected with each other; and the memory stores computer-executable instructions for controlling the one or more processors to:

obtain an image of a target device, the image of the target device comprising a target object of a first color and a background object of a second color;

process the image of the target device to obtain a processed image, the processed image comprising a processed target object of a third color and a processed background object of a fourth color;

detect a contour of the processed target object of the third color;

calculate an area encircled by the contour; and calculate a distance between a camera and the target device upon determination of the area encircled by the contour wherein, to process the image of the target device, the memory stores computer-executable instructions for controlling the one or more processors to:

obtain color component values in a color space of a pixel data of the image of the target device; and convert the color component values into converted color component values based on a first conversion algorithm;

wherein the color component values of the pixel data comprise a first color component value and a second color component value;

wherein the first conversion algorithm comprises:

subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

18. A computer-program product comprising a non-transitory tangible computer-readable medium having computer-readable instructions thereon, the computer-readable instructions being executable by a processor to cause the processor to perform:

obtaining an image of a target device, the image of the target device comprising a target object of a first color and a background object of a second color;

processing the image of the target device to obtain a processed image, the processed image comprising a processed target object of a third color and a processed background object of a fourth color;

detecting a contour of the processed target object of the third color;

calculating an area encircled by the contour; and calculating a distance between a camera and the target device upon determination of the area encircled by the contour wherein processing the image of the target device comprises:

obtaining color component values in a color space of a pixel data of the image of the target device; and converting the color component values into converted color component values based on a first conversion algorithm;

wherein the color component values of the pixel data comprise a first color component value and a second color component value;

wherein the first conversion algorithm comprises:

subtracting the second color component value of the pixel data from the first color component value of the pixel data to obtain a subtracted value; and assigning an absolute value of the subtracted value as a color component value for each color component of the pixel data, thereby obtaining the converted color component values of the processed image.

* * * * *